United States Patent
Kramer et al.

(10) Patent No.: US 6,552,506 B2
(45) Date of Patent: Apr. 22, 2003

(54) METHOD FOR DETERMINING THE POSITION OF AN ELEMENT DRIVEN BY THE DRIVE SHAFT OF A DIRECT CURRENT MOTOR

(75) Inventors: Detlef Kramer, Schwerte (DE); Stefan Otte, Witten (DE); Cassian Kock, Haltern (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/174,426

(22) Filed: Jun. 17, 2002

(65) Prior Publication Data

US 2003/0011336 A1 Jan. 16, 2003

Related U.S. Application Data

(63) Continuation of application No. PCT/EP01/06220, filed on Jun. 1, 2001.

(30) Foreign Application Priority Data

Jun. 6, 2000 (DE) .......................................... 100 28 041

(51) Int. Cl.$^7$ ................................................. H02P 1/04
(52) U.S. Cl. ........................ 318/466; 318/266; 318/280; 318/282; 318/286; 318/466; 318/468; 318/470; 701/36; 701/49; 296/216.01; 296/223; 388/815; 388/909; 388/903
(58) Field of Search ................................ 318/264–266, 318/280–286, 466–470, 626, 139, 565; 701/36, 49; 296/216.01, 223; 388/815, 909, 903

(56) References Cited

U.S. PATENT DOCUMENTS

| | | | | | |
|---|---|---|---|---|---|
| 4,924,166 | A | * | 5/1990 | Roussel | 318/608 |
| 5,334,876 | A | * | 8/1994 | Washeleski et al. | 307/10.1 |
| 5,483,135 | A | | 1/1996 | Parks | |
| 5,497,326 | A | * | 3/1996 | Berland et al. | 364/424.05 |
| 5,543,692 | A | * | 8/1996 | Howie et al. | 318/282 |
| 6,002,228 | A | * | 12/1999 | Knab | 318/469 |
| 6,064,165 | A | * | 5/2000 | Boisvert et al. | 318/465 |
| 6,194,857 | B1 | | 2/2001 | Stolz | |
| 6,326,757 | B1 | * | 12/2001 | Aoki et al. | 318/599 |
| 6,404,158 | B1 | * | 6/2002 | Boisvert et al. | 318/469 |
| 6,459,223 | B2 | * | 10/2002 | Mauel et al. | 318/445 |

* cited by examiner

*Primary Examiner*—Bentsu Ro
*Assistant Examiner*—Rina I. Duda
(74) *Attorney, Agent, or Firm*—Brooks & Kushman, P.C.

(57) ABSTRACT

A method for determining the position of a movable element to be driven by a direct current motor between first and second positions includes counting ripples contained in a motor current signal as the motor rotates to drive the element. The position of the element is determined based on the counted ripples. The motor actuates, until the current signal is void of ripples, to move the element into the first position when the element is to be moved out of the first position towards the second position. The counted ripples is reset to a reset value after the motor has been actuated to move the element into the first position such that the reset value corresponds to the position of the element being in the first position. The motor actuates to move the element towards the second position after the counted ripples has been reset.

5 Claims, 1 Drawing Sheet

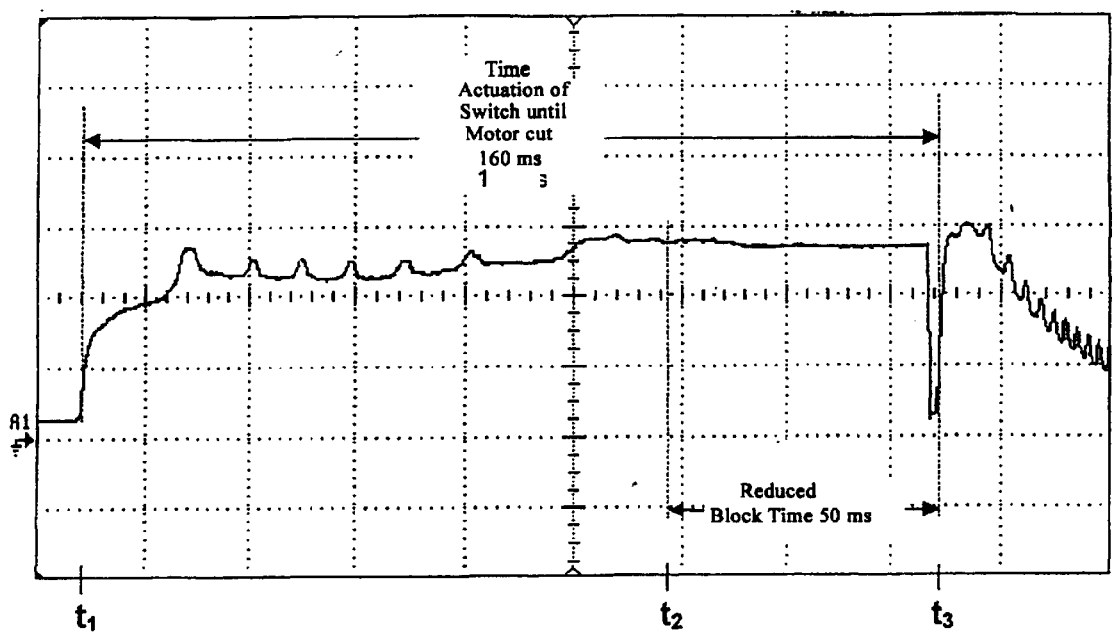

METHOD FOR DETERMINING THE POSITION OF AN ELEMENT DRIVEN BY THE DRIVE SHAFT OF A DIRECT CURRENT MOTOR

CROSS-REFERENCE TO RELATED APPLICATIONS

This is a continuation of International Application PCT/EP01/06220, published in German, with an international filing date of Jun. 1, 2001.

BACKGROUND OF THE INVENTION

1. Field of the Invention

The invention concerns a process for determining the position of an element driven by the drive shaft of a direct current motor within a predetermined segment of travel between two block positions by evaluating the current ripple contained in the armature current signal.

2. Background Art

The armature current signal of a direct current motor comprises a so-called direct component and a ripple component superimposed on the direct component. The ripple component arises when the direct current motor is operated as a consequence of the interaction of the magnet (field), the armature winding, and the commutator of the direct current motor. This expresses itself in a short-term change in the induced voltage, which produces the ripple content of the armature signals.

The current peaks contained in the armature current signal that arise in the described manner—referred to below as current ripple—occur when the armature turns, and they have a frequency corresponding to the number of collector bars. For example, if the armature has 10 collector bars, there are accordingly 10 current ripples that can be identified in the armature current signal. Thus, counting the current ripple can give information about the current rotational position of the armature of the direct current motor and thus regarding the driven element within its predetermined segment of travel. To accomplish this, the analog armature current signal is digitized to be able to perform a corresponding count.

Since it is known ahead of time how many current ripples the direct current motor must turn through until the segment between the two block positions bordering the segment of travel is covered, the position of the driven element can be determined by counting the current ripple. Such processes are used, for example, in the area of motor vehicles to control the adjustment drive of, for example, power windows and/or sunroofs.

An essential element in capturing the position of the window glass, for example, is the position at which the pinching protection can be turned off when the window is closed. The pinching protection has to be turned off so that the window glass can go completely in its top block and into the seals provided there, without the motor being turned off as a result of increased load. If the counting of the current ripple to determine the position of the window glass is incorrect, it can happen that the pinching protection is turned off too early or too late.

To increase accuracy of determining the position of the moving element, for example a motor vehicle window glass, there is a system-side standardization or restandardization when the window has gone into its top block position, since now the actual position of the window glass and the mechanically defined block position coincide. This restandardization resets the current ripple counter to zero, which prevents the addition of errors over a longer period of time.

Even if such restandardization measures are able in principle to determine the exact position of the driven element over a longer period of time, such restandardization is insufficient if the driven element moves without operation of the direct current motor during the period of time when the driven element is in its block position. This is the case, for example, in such applications in which to drive the driven element there are, between the direct current motor and the moving element, mechanical means of transmission, such as perhaps adjustment devices to activate the window glass of a motor vehicle.

If such a window glass remains closed in its top block position over a certain period of time, the window glass-raising mechanism loosens by a few millimeters, especially due to the vibrations which occur as a result of operation of the motor vehicle. Such movement of the window glass which is not due to operation of the direct current motor causes the position of the window glass to be incorrectly captured when it is operated, since the actual position of the window glass is not—as assumed by the system—in the top block position when it is standardized.

SUMMARY OF THE INVENTION

Therefore, starting from the prior art discussed above, the invention is based on the task of further developing a process of the type mentioned at the beginning in such a way that it is possible to determine the precise position of the driven element, even when it has moved out of its block position without being recognized by the system.

This task is solved according to the invention by a process of the type mentioned at the beginning which involves, when there is a signal to move the driven element out of a block position, actuating the direct current motor to insert the driven element into the block position and performing a system-side standardization relative to the current block position when the driven element is in its proper block position, before actuating the direct current motor to move the movable element out of the block position, in response to this signal.

To avoid determining an incorrect position of the window glass when a user wants to move the driven element out of its block position, the process according to the invention involves first actuating the direct current motor in order first to insert the driven element into its block position. When it has been ensured that the driven element is (back) in its block position, so that the actual position of the drive element corresponds to the actual block position, a system-side (re)standardization is performed.

Only once this standardization has been completed is the direct current motor actuated to move the driven element out of its block position. This recalibrates the position capture with the beginning of moving the driven element out of its block position relative to the possible segment of travel of the driven element. Therefore, the subsequent position capture of the moving element is not only free of errors due to prior movements, but is also free of standardization errors due to undetected movement of the driven element which occurred between the recorded insertion movement of the driven element into its block position and the desired movement out of its block position.

It can be detected that the driven element is completely in its block position by evaluating the load counteracting the movement of the direct current motor. The direct current motor can also be actuated, for a predetermined period of time, to insert the driven element (back) into the block position.

In a preferred sample embodiment, the direct current motor is actuated to insert the driven element into the block position until no current ripple can be detected any more in the armature current signal. If no current ripple can be detected any more, the direct current motor does not move any more, despite being actuated, which occurs when the driven element has been inserted into the block position and thus is acting against its end stop. To increase the security, the direct current motor can nevertheless be actuated, for a predetermined period of time, to insert the driven element into the block position.

The process according to the invention is suitable for adjustment drives in motor vehicles, perhaps to activate window glass, sunroofs, and/or seats. The process according to the invention is especially suitable for use to operate an adjustment device designed as a window raiser, since this process clearly increases security with regard to determining the exact point at which the pinching protection can be turned off when the window glass is closed.

BRIEF DESCRIPTION OF THE DRAWINGS

The FIGURE illustrates an example of the analog ripple signal of the direct current motors of such an adjustment device designed as a window raiser in accordance with an embodiment of the present invention.

DETAILED DESCRIPTION OF THE PREFERRED EMBODIMENT(S)

The FIGURE shows an example of the analog ripple signal of the direct current motors of such an adjustment device designed as a window raiser. The window has previously been inserted into its top block position and has remained in this position for a certain period of time. Therefore, the analog armature current signal begins at the zero level. At time point $t_1$, the system recognizes that an operator desires to open the window glass again. At time point $t_1$ the direct current motor of the adjustment device is fed current to make the window go into its block position. Rotation of the armature of the direct current motor is recognized by the detection of several current ripples. At time point $t_2$ it has been determined that the direct current motor, that is its armature, is no longer turning, due to the lack of current ripple.

For security, in this sample embodiment the direct current nevertheless continues to be fed in this direction for a predetermined period of time (here 50 ms). The system is then (re)standardized, so that the next time the direct current motor is actuated, this time with the goal of actually moving the window glass out of its block position, it is possible to count current ripples starting from an actual position of the window glass that coincides with the block position. The point in time when the direct current motor is switched is marked $t_3$ in the diagram. In the sample embodiment shown, the total duration of the poststandardization before the window glass begins to move out of the block position is given as 160 ms—a period of time which a user could not perceive as a delay.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining the position of a movable element to be driven by the drive shaft of a direct current motor along a travel segment between first and second end positions, the method comprising:

counting current ripples contained in an armature current signal of the direct current motor as the drive shaft of the direct current motor rotates to drive the movable element;

determining the position of the movable element along the travel segment based on the counted current ripples;

actuating the direct current motor to move the movable element into the first end position when the movable element is to be moved out of the first end position towards the second end position;

resetting the counted current ripples to a reset value after the direct current motor has been actuated to move the movable element into the first end position and the position of the movable element is at the first end position such that the reset value corresponds to the position of the movable element being at the first end position; and actuating the direct current motor to move the movable element out of the first end position towards the second end position after the counted current ripples has been reset to the reset value.

2. The method of claim 1 wherein:

the step of actuating the direct current motor to move the movable element into the first end position includes actuating the direct current motor for a predetermined time period to move the movable element into the first end position.

3. The method of claim 1 wherein:

the step of actuating the direct current motor to move the movable element into the first end position includes actuating the direct current motor to move the movable element into the first end position until the armature current signal is void of current ripples.

4. The method of claim 3 further comprising:

prior to the step of actuating the direct current motor to move the movable element towards the second end position, actuating the direct current motor for a predetermined time period to move the movable element into the first end position.

5. The method of claim 1 wherein:

the movable element is a vehicular movable object.

* * * * *